United States Patent
Hardie et al.

(10) Patent No.: US 7,907,599 B2
(45) Date of Patent: Mar. 15, 2011

(54) DETERMINATION OF SIP TRANSPORT TO REDUCE CALL SETUP DELAYS

(75) Inventors: Terry Hardie, Union City, CA (US);
Kevin Isacks, Fremont, CA (US);
Sreedhar Pampati, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 202 days.

(21) Appl. No.: 11/402,201

(22) Filed: Apr. 10, 2006

(65) Prior Publication Data

US 2007/0237155 A1 Oct. 11, 2007

(51) Int. Cl.
*H04L 12/66* (2006.01)
(52) U.S. Cl. ......... 370/352; 370/248; 370/251; 370/252; 370/260; 370/390; 370/401; 370/466; 455/406; 709/203; 709/206; 709/225; 709/227; 709/230; 709/240; 709/245
(58) Field of Classification Search .................. 370/260, 370/401, 466; 455/406; 709/203, 206, 225, 709/227, 230, 240, 245
See application file for complete search history.

(56) References Cited

U.S. PATENT DOCUMENTS

| | | | | |
|---|---|---|---|---|
| 2004/0024879 A1* | 2/2004 | Dingman et al. | ............. | 709/227 |
| 2004/0054805 A1* | 3/2004 | Sen et al. | ....................... | 709/240 |
| 2004/0223489 A1* | 11/2004 | Rotsten et al. | ................. | 370/352 |
| 2004/0250253 A1* | 12/2004 | Khartabil | ...................... | 719/310 |
| 2005/0220139 A1* | 10/2005 | Aholainen | ..................... | 370/466 |
| 2006/0047840 A1* | 3/2006 | Postmus | ....................... | 709/230 |
| 2006/0101143 A1* | 5/2006 | Garcia et al. | .................. | 709/225 |
| 2006/0203749 A1* | 9/2006 | Tseng | ............................ | 370/260 |
| 2006/0239275 A1* | 10/2006 | Zlateff et al. | ................. | 370/400 |
| 2007/0078986 A1* | 4/2007 | Ethier et al. | ................... | 709/227 |
| 2007/0081518 A1* | 4/2007 | Jain et al. | ...................... | 370/352 |

* cited by examiner

*Primary Examiner* — Pankaj Kumar
*Assistant Examiner* — Lonnie Sweet
(74) *Attorney, Agent, or Firm* — Kilpatrick Townsend and Stockton LLP

(57) ABSTRACT

Methods, apparatuses, and systems are presented for determining an appropriate transport protocol for supporting Session Initiation Protocol (SIP) communication, which may involve repeatedly sending SIP requests from a first device destined for a second device using at least one transport protocol, attempting to receive responses to the SIP requests at the first device from the second device, based on results of attempting to receive responses to the SIP requests, updating a data record associated with the first device, the data record containing an entry for the second device, the entry for the second device including at least one indication of operability with the at least one transport protocol, and selecting one of the at least one transport protocol, based on the entry for the second device in the data record, as a selected transport protocol for establishing a desired SIP communication between the first device and the second device.

29 Claims, 6 Drawing Sheets

Configuration Table

|  | Ping interval (402) | Pkt 1055 threshold (404) | RTT threshold (406) | Transports to try (408) |
|---|---|---|---|---|
| Server 2 | 200 msec | 0.5% | 300 msec | TLS |
| Server 3 | 200 msec | 0.2% | 250 msec | TLS, TCP UDP |
|  |  |  |  |  |
|  |  |  |  |  |

Dynamic Statistics Table

| | Transport (502) | Current RTT (504) | Ave. RTT (506) | Pkt loss (508) | Last time up (510) | Status (512) |
|---|---|---|---|---|---|---|
| Server 2 | TLS | 101 msec | 107 msec | 0.03% | 17:04:03 | X |
| Server 2 | TCP | 75 msec | 77 msec | 0.04% | 02:16:15 | X |
| Server 2 | UDP | 50 msec | 57 msec | 0.07% | 05:30:21 | X |
| Server 3 | TLS | 68 msec | 70 msec | 0.05% | 06:41:02 | X |
| Server 3 | TCP | 70 msec | 72 msec | 0.03% | 11:59:30 | ✓ |
| Server 3 | UDP | 95 msec | 90 msec | 0.06% | 08:15:27 | X |
| | | | | | | |
| | | | | | | |

FIG. 5

DETERMINATION OF SIP TRANSPORT TO REDUCE CALL SETUP DELAYS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

FIG. 1 depicts an illustrative system 100 in which a desired Session Initiation Protocol (SIP) communication may be established over two possible routes according to an embodiment of the invention. As used here, a SIP communication refers to communication utilizing a SIP protocol and/or any variations or improvements on such a protocol. As is known in the art, a SIP protocol is an ASCII-based, application-layer control protocol described in RFC 3261. Typically, the SIP protocol is implemented over an underlying transport layer protocol. Such transport layer protocols include Transport Layer Security (TLS), Transmission Control Protocol (TCP), Datagram Protocol (UDP), and others.

System 100 includes a first SIP user agent 102, a second SIP user agent 104, a first SIP server 106, a second SIP server 108, and a third SIP server 110. SIP user agents 102 and 104 may be user devices capable of interfacing with the user to provide communication to the user over a SIP protocol. Examples of SIP user agents include SIP phones, SIP "softphones" which may comprise computer equipped with audio capabilities and necessary software, and other types of SIP compatible user equipment.

SIP servers broadly refer to hardware and/or software devices utilized in the delivery of SIP-based communications over packetized networks. As such, SIP servers as referred to here includes entities such as SIP proxy servers, SIP redirect servers, SIP gateways, etc. The SIP servers 106, 108, and 110 may exist in a common domain. For example, they may exist in a common domain 112 as organized by a domain name service (DNS). Alternatively, the SIP servers 106, 108, and 110 may exist in different domains.

In FIG. 1, SIP user agent 102 is attempting to establish a desired SIP communication with SIP user agent 104. For example, this may be a request to initiate a SIP call between the two user agents. SIP user agent 102 initiates this communication by sending a SIP call request to the first SIP server 106. The first SIP server 106 now must make a decision to route the call request, such that it will efficiently reach SIP user agent 104.

As shown in FIG. 1, there are two possible routes for this SIP call request. The first possible route involves SIP user agent 102, the first SIP server 106, the second SIP server 108, and SIP user agent 104. This would require the first SIP server 106 to route the call request to the second SIP server 108. The second possible route involves SIP user agent 102, the first SIP server 106, the third SIP server 110, and SIP user agent 104. This would require the first SIP server 106 to route the call request to the third SIP server 110.

It is up to the first SIP server 106 to decide the route—i.e., to which SIP server should the call request be routed next. The timeliness of this decision can be a critical factor. For example, in the case of a call request, there is usually some limited time span in which the call request must be forwarded from the source (i.e., SIP user agent 102) to the destination (i.e., SIP user agent 104), and a response must be returned from the destination back to the source. If the first SIP serer 106 takes too long to make its decision to route the SIP call request, that can significantly increase the likelihood that time constraints associated with the call set up may be violated, causing a failure such as a time-out condition. Furthermore, a human caller may not wait too long when placing a call and can decide to hang up if a prolonged period of time is required for call set up.

For clarity of illustration, FIG. 1 depicts simple routes that only involve a routing decision by the first SIP server 106. In more complex environments, a SIP communication may travel over longer routes that traverse numerous SIP servers. As such, such a routing decision may need to be made at each one of the plurality of SIP servers along the route. This underscores the need for each routing decision to be made in a timely manner, because individual delays associated with routing decisions at the numerous SIP servers along the route will accumulate, and the effects of such delays are amplified over longer routes.

Thus, there is a significant need for techniques for facilitating SIP communications by efficiently selecting connections such as specific transport protocols.

BRIEF SUMMARY OF THE INVENTION

The present invention relates to methods, apparatuses, and systems for determining an appropriate transport protocol for supporting Session Initiation Protocol (SIP) communication between a first device and a second device. The methods, apparatuses, and systems may involve repeatedly sending SIP requests from the first device destined for the second device using at least one transport protocol, attempting to receive responses to the SIP requests at the first device from the second device, based on results of attempting to receive responses to the SIP requests, updating a data record associated with the first device, the data record containing an entry for the second device, the entry for the second device including at least one indication of operability with the at least one transport protocol, and selecting one of the at least one transport protocol, based on the entry for the second device in the data record, as a selected transport protocol for establishing a desired SIP communication between the first device and the second device.

According to a preferred embodiment of the invention, the SIP requests comprise SIP OPTIONS requests. The sending of the SIP requests from the first device may involve sending a plurality of SIP requests using different transport protocols. The plurality of different transport protocols may include a Transport Layer Security (TLS) protocol, a Transmission Control Protocol (TCP), and a User Datagram Protocol (UDP). Of course, the plurality of different transport protocols are not necessarily limited to these specific protocols. The SIP requests may be repeatedly sent from the first device on a periodic basis.

The at least one indication of operability may comprise a listing of operable transport protocols. The at least one indication of operability may comprises a Boolean value for each of the at least one transport protocols.

The entry for the second device may further comprise at least one performance statistic associated with each of the at least one transport protocols. The election of the transport protocol may be based on the at least one performance statistic.

The selection of the transport protocol may include selection of the second device from amongst a plurality of possible devices and selection of a transport protocol to be used in establishing the desired SIP communication with the second device.

The at least one performance statistic may comprise a measure of round trip time, a measure of rate of packet loss, a measure of time of last successful communication, etc.

The data record may be stored within the first device. The first device and the second device may be SIP servers.

BRIEF DESCRIPTION OF THE DRAWINGS

FIG. 4 shows an example of a configuration table that may be associated with a particular SIP server according to an embodiment of the present invention.

FIG. 5 shows an example of a dynamic statistics table that may be associated with a particular SIP server according to an embodiment of the present invention.

DETAILED DESCRIPTION OF THE INVENTION

Figure 2:
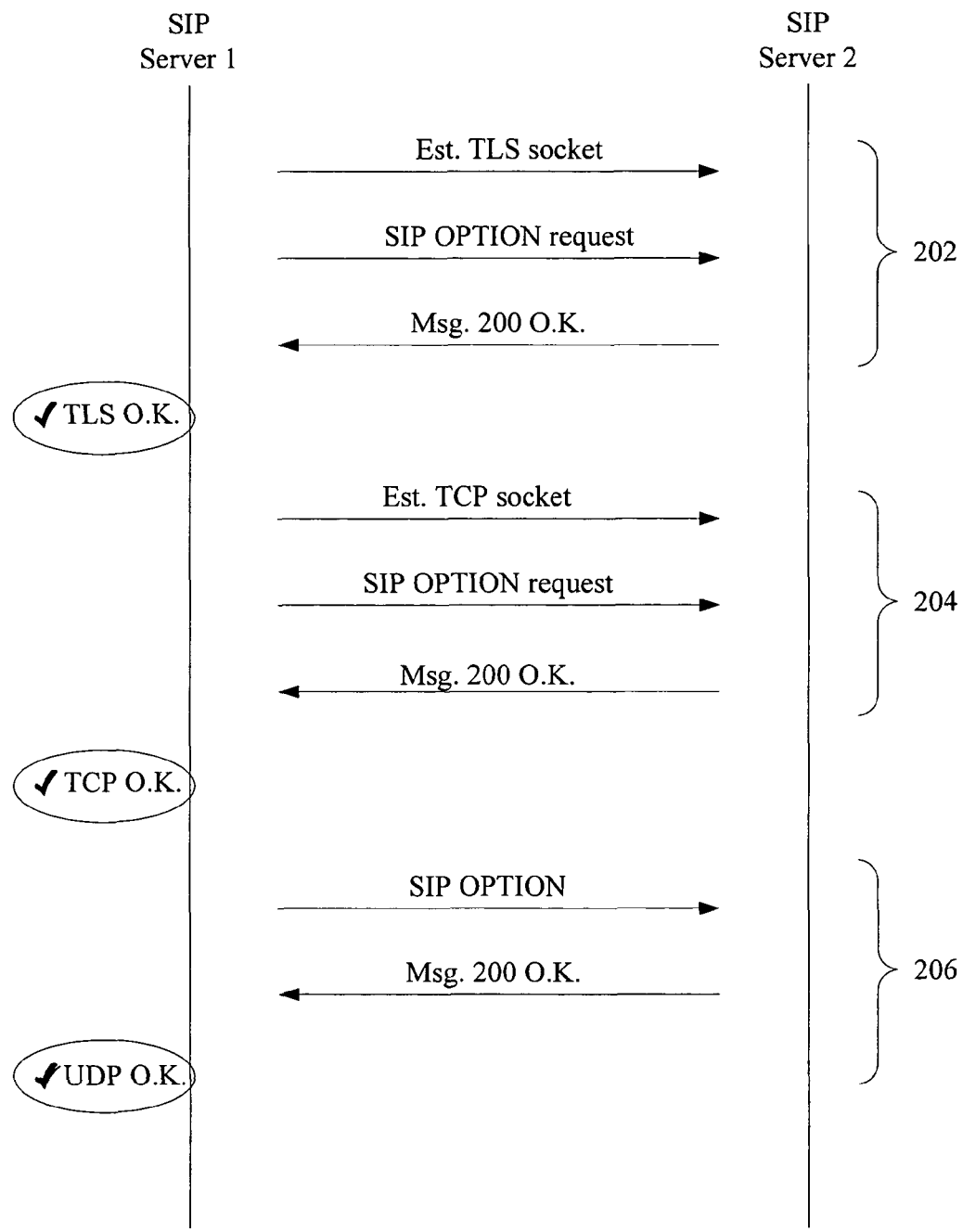
FIG. 2 illustrates SIP requests that can be repeatedly sent from a first SIP server to a second SIP server to "test" the operability of different transport protocols between the two servers, before establishing a desired SIP communication between the first SIP server and the second SIP server, according to one embodiment of the present invention.

FIG. 2 illustrates SIP requests that can be repeatedly sent from a first SIP server to a second SIP server to "test" the operability of different transport protocols between the two servers, before establishing a desired SIP communication between the first SIP server and the second SIP server, according to one embodiment of the present invention.

As mentioned previously, communication based on the SIP protocol is typically implemented over an underlying transport layer protocol, such as a TLS, TCP, UDP, or other protocol. Even though the first SIP server may be able to handle SIP communications using a number of different transport layer protocols such as TLS, TCP, UDP, and others, there may be no guarantee that the second SIP server would be able to do the same. The transport layer capabilities of the second SIP server may be different from that of the first SIP server for a variety of reasons. For example, the second SIP server may be made by a different manufacturer, belong to a different generation of equipment, etc. By attempting to send SIP requests to the second SIP server using different transport layer protocols, the first SIP server can better determine which transport layer protocol should be used to conduct SIP communications with the second SIP server.

Referring to FIG. 2, the first SIP server uses three sets of exchanges 202, 204, and 206, to test the operability of SIP communications with the second SIP device using TLS, TCP, and UDP protocols, respectively.

In exchange 202, the first SIP server sends establishes a TLS socket with the second SIP server. Then the first SIP server sends a SIP OPTIONS request to the second SIP server over the TLS connection. Here, the second SIP server sends a "message 200" in response, indicating that the second SIP server has successfully received and responded to the first SIP server's SIP communications using the TLS protocol. If the second SIP server responds with an error message of some sort, or does not respond at all, the first SIP server may conclude that the second SIP server is not capable of SIP communications with the first SIP server using the TLS protocol.

In exchange 204, the first SIP server establishes a TCP socket with the second SIP server. Then the first SIP server sends a SIP OPTIONS request to the second SIP server over the TCP connection. Here, the second SIP server sends a "message 200" in response, indicating that the second SIP server has successfully received and responded to the first SIP server's SIP request using the TCP protocol. If the connection is not working properly, the second SIP server may respond with an error message of some sort, or not respond at all.

In exchange 206, the first SIP server sends a SIP OPTIONS request to the second SIP server over an UDP connection. Here, the second SIP server sends a "message 200" in response, indicating that the second SIP server has successfully received and responded to the first SIP server's SIP request using the UDP protocol. If the connection is not working properly, the second SIP server may respond with an error message of some sort, or not respond at all.

Exchanges 202, 204, and 206 may be executed at the same time (in parallel) or one after another (in series). In either case, exchanges 202, 204, and 206 may be repeated to test the operability of SIP communication over the TLS, TCP, and UDP protocol over time. The information gathered using exchanges 202, 204, and 206 may provide an up-to-date picture of the operability of different transport layer protocols for SIP communications between the first SIP server and the second SIP server.

In an embodiment of the invention, different performance statistics may be collected using exchanges 202, 204, and 206. For example, the first SIP server may measure the round trip time it took for the SIP OPTIONS request to be sent out to the second SIP server and the "message 200" to be returned from the second SIP server. Another example is a measure of packet loss. For instance, if some SIP OPTIONS requests are responded to with a "message 200" from the second SIP server, but other SIP OPTIONS request are not responded to, then a percentage of the number of successfully returned messages to the total number of requests can be used as a measure of packet loss. According to this embodiment of the invention, a set of performance statistics is collected for each of the protocols tested.

Figure 3:
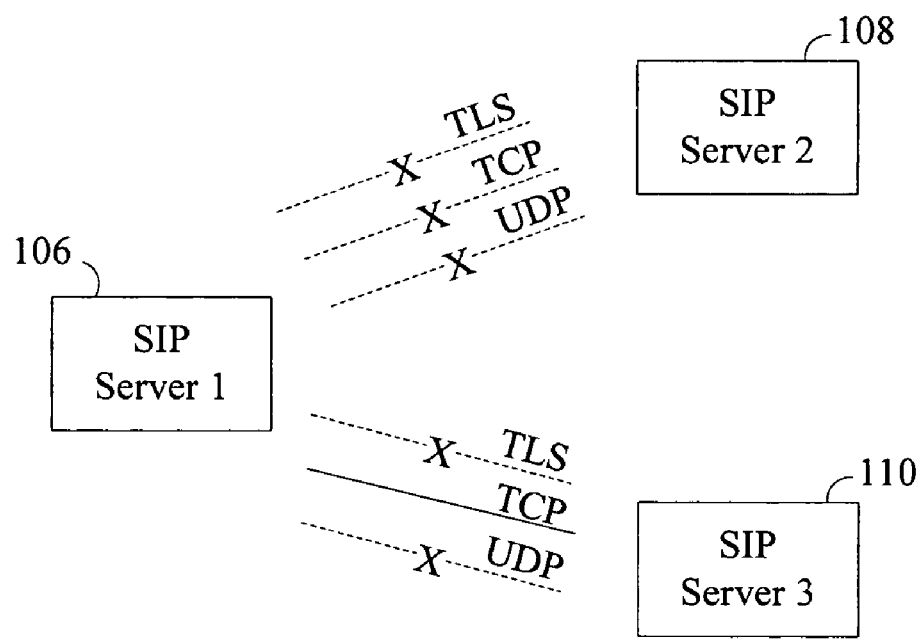
FIG. 3 depicts transport layer operability information that may be obtained for different SIP servers according to an embodiment of the invention, by performing SIP requests such as those illustrated in FIG. 2.

FIG. 3 depicts transport layer operability information that may be obtained for different SIP servers according to an embodiment of the invention, by performing SIP requests such as those illustrated in FIG. 2. Here, the first SIP server 106 has "tested" SIP communications using various transport layer protocols with both the second SIP server 108 and the third SIP server 110. Consequently, the first SIP server 106 has developed an up-to-date picture of the operability of different transport layer protocols for SIP communications between the first SIP 106 server and the second SIP server 108, as well as for SIP communications between the first SIP server 106 and the third SIP server 110.

In the example shown in FIG. 3, the first SIP server 106 has determined that SIP communications with the second SIP server 108 is not operable over all three transport layer protocols TLS, TCP, and UDP. This is indicated by the "x" symbol shown in the paths between the first SIP server 106 and the second SIP server 108.

In this example, the first SIP server 106 has also determined that SIP communications with the third SIP server 110 is operable over the TCP transport layer protocol. This is indicated by the solid line shown in the TCP path. The first SIP server 106 has further determined that SIP communications with the third SIP server 110 is not operable over the TLS and UDP transport layer protocols. This is indicated by the "x" symbol shown in the TLS path and the UDP path between the first SIP server 106 and the third SIP server 110.

Figure 1:
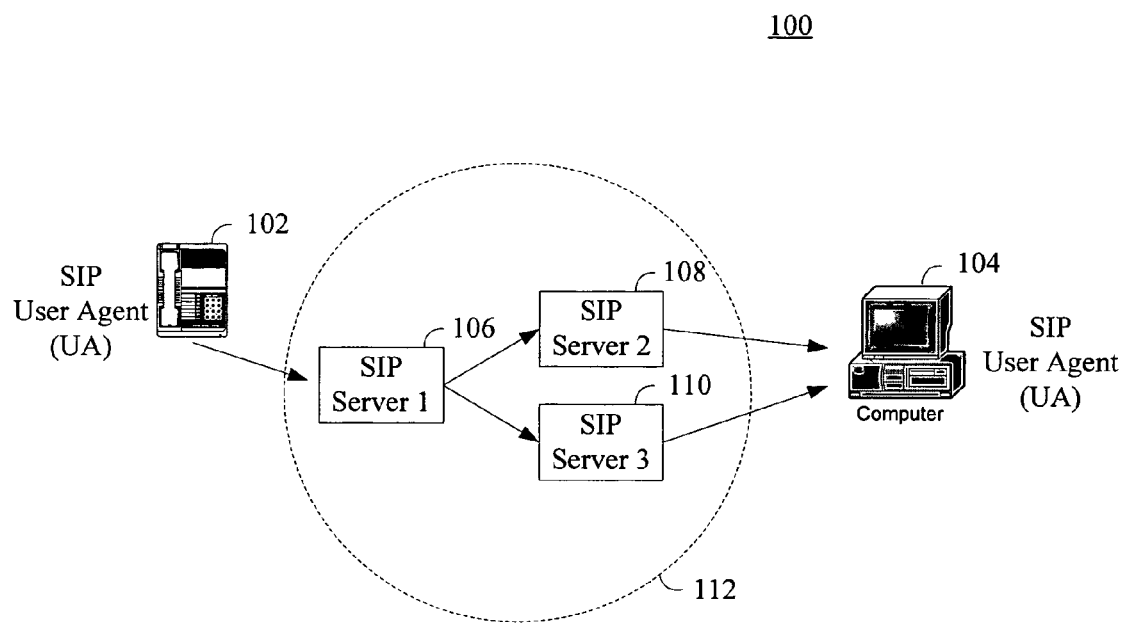
FIG. 1 depicts an illustrative system in which a desired Session Initiation Protocol (SIP) communication may be established over two possible routes according to an embodiment of the invention.

Information such as that shown in FIG. 3 can significantly improve the performance of the system in establishing SIP communications. Because this information is already obtained in anticipation of a later attempted SIP communication, less time is wasted in testing possible links when the SIP communication occurs. For example, referring to FIG. 1, when a SIP call set up request destined for SIP user agent 104 is sent from SIP user agent 102 to the first SIP server 106, the first SIP server 106 can readily access the information shown in FIG. 3 to determine the best route for forwarding the SIP call request. In this case, the first SIP server 106 can determine that the best route is to forward the call request to the third SIP server 110 using the TCP transport protocol. Forwarding the call set up request to the second SIP server 108 over the TLS, TCP, or UDP protocol will probably be unsuccessful. Similarly, forwarding the call set up request to the third SIP server 110 over the TLS or UDP protocol will probably be unsuccessful.

In prior art system, upon receiving such a call set up request, the first SIP server 106 likely does not have such readily accessible information. Thus, the first SIP server 106 may begin systematically attempting different connections over different transport layer protocols, until an operable connection is found. Such a search process consumes valuable time. For an application such as a SIP call setup request, the amount of time wasted can greatly degrade the performance of the SIP communication system, and possibly cause failures such as time outs for call set up requests.

According to an embodiment of the present invention, information such as that represented in FIG. 3 is already collected and ready to be used when the first SIP server 106 receives the call request from user agent 102. That is, when it receives the call set up request, the first SIP server 106 does not need to make ill-fated attempts to connect to the second SIP server 108 using the TLS, TCP, or UDP protocol, or connect to the third SIP server 110 using the TLS or UDP protocol. As such, valuable time is not wasted on attempting to use undesirable or inoperable connections.

Information such as that shown in FIG. 3 can be organized in different ways, according to various embodiments of the invention. The following describes examples of a configuration table and a dynamic statistics table used for organizing such information.

FIG. 4 shows an example of a configuration table 400 that may be associated with a particular SIP server, such as SIP server 106, according to an embodiment of the present invention. Configuration table 400 contains parameter that control how operability information is collected and used. Here, these parameters include a ping interval 402, a packet loss threshold 404, a round trip time (RTT) threshold 406, and a list of transports to try 406.

Configuration table 400 comprises a row for each one of a number of other SIP servers with which connections may be formed. As such, these configuration parameters can be separately specified for each SIP server. The particular control parameters shown in table 400 are discussed in more detail below.

Ping interval 402 specifies the duration of the time between repeated "tests" of SIP communications over the various transport layer protocols. As mentioned previously, these may involve attempts to send SIP OPTIONS requests to a particular SIP server over various transport layer protocols. For instance, if the ping interval 402 is set to N milliseconds (msec), exchanges such as 202, 204, and 206 depicted in FIG. 2 may be repeated every N msec.

Packet loss threshold 404 specifies a maximum level of packet loss, which can be used to make a determination of whether a particular connection is operable. Here, the packet loss threshold is specified as a percentage. According to one embodiment, a simple rule for determining operability of a connection may be that if a measure of packet loss over the connection is above the packet loss threshold, the connection is deemed inoperable. According to other embodiments, more complex rules for determining operability of a connection, such as those involving more than one parameter, may be established.

Round trip time (RTT) threshold 406 specifies a maximum duration of round trip time, which can be used to make a determination of whether a particular connection is operable. Here, the RTT threshold is specified in msec. According to one embodiment, a simple rule for determining operability of a connection may be that if a measure of round trip time over the connection exceeds the RTT threshold, the connection is deemed inoperable. According to other embodiments, more complex rules for determining operability of a connection, such as those involving more than one parameter, may be established.

The list of transports to try, 406, specifies the particular transport layer protocols to try for each SIP server. These transport layer protocols may include TLS, TCP, UDP, etc. The list of transport layer protocols to try may differ for each SIP server. Just as an example, it may be known that a particular SIP server is of a certain model from a certain manufacturer, and as such it only has TLS capabilities but no TCP or UDP capabilities. In this case, it may be unnecessary to test communications with this SIP server over the TCP or UDP protocol. In other words, it may only be necessary to test communication with that SIP server over the TLS protocol, to see if that TLS connection is operating properly. As such, for this particular SIP server, the list of transports to try may include only the TLS protocol.

FIG. 5 shows an example of a dynamic statistics table 500 that may be associated with a particular SIP server, such as SIP server 106, according to an embodiment of the present invention. Dynamic statistics table 500 contains parameters derived from measurements made on various connections to indicate the operability of those connections. Here, these parameters include performance statistics such as current round trip time (RTT) 504, average RTT 506, percentage packet loss 508, and last time connection was up 510. The parameter also include status 512 which indicates the operability status of a particular connection.

Dynamic statistics table 500 is maintained for a particular SIP server. For example, table 500 may be maintained for the first SIP server 106 shown in FIG. 1. Table 500 comprises a row for each connection that may be made between this SIP server and another SIP server, using a particular transport layer protocol. The particular dynamic statistics parameters shown in table 500 are discussed in more detail below.

Current round trip time (RTT) 504 indicates the duration of round trip time measured on a recent SIP communication. For example, a SIP OPTIONS request may be sent from the first SIP server 106 to the second SIP server 108, which responds with a "message 200" response, indicating an operable SIP communication. Here, the round trip time may be measured from the time the first SIP server 106 sends the SIP OPTIONS request to the time the first SIP server 106 receives the "message 200" response. From the perspective of the first SIP server 106, this round trip time thus provides an indication of the availability of the connection with a particular SIP server over a particular transport protocol.

Average RTT 506 is a measure of the average round trip time and may be calculated by averaging a number of previous values of current RTT 504. Average RTT 506 provides a more stable value that averages out jitters in the round trip time measurement. Using such an average RTT value may prevent the system from choosing connections based on round trip data that is fluctuating. This can be effectively reduce thrashing, whereby the system switches back an forth between different connections as result of fluctuations in individual round trip time values.

Percentage packet loss 508 is a percentage of the number of packets that are lost versus the number of packets that are expected to arrive. For example, if the first SIP server 106 has sent 50 SIP OPTIONS requests to the second SIP server 108 over the TLS transport protocol, and all but 1 of those 100 SIP OPTIONS requests have been responded to with "message 200" response from the second SIP server 106, then percentage packet loss 508 may indicate "2%" as the percentage of packets lost. Thus, from the perspective of the first SIP server 106, percentage packet loss 508 provides an indication of the reliability of the connection with a particular SIP server over a particular transport protocol.

The last time the connection was up, 510, provides a time stamp corresponding to the time when a connection was operable. As shown in FIG. 5, last time connection was up 510 is expressed in an "hour:minute:second" format. If additional time stamp information such as date is needed, last time connection was up 510 may also include such additional time stamp information. From the perspective of the first SIP server 106, parameter 510 indicate the last the connection with a particular server over a particular transport protocol was operable.

Status 512 is indicates the operability status of a connection. Status 512 may be expressed as a Boolean value. In FIG. 5, the Boolean values are shown as "X" and "√" for ease of illustration. Here, "X" means the connection is not operable, and "√" means the connection is operable. Of course, an implementation of table 500 may utilize values of "0" and "1" as Boolean values.

A alternative representation of operability status different from status 512 is a listing of operable transport layer protocols for each server. In this representation, each server is associated with a list of operable transport layer protocols for that server. The list generated and updated in a similar fashion as that described for status 512.

According to various embodiments of the invention, there may be different ways of deciding whether the status of connection is "operable." The decision may take into account results of attempting to receive responses to the SIP requests, such shown in exchanges 202, 204, and 206 in FIG. 2.

In one embodiment, the decision is simply based on a ratio of successful attempts to receive responses to SIP request. For example, the first SIP server may attempt exchange 202 ten times. A threshold may be set as seven out of ten. In that case, if the first SIP server receives seven or more "message 200" responses back resulting from the ten attempts, then the connection may be deemed operable. Otherwise, the connection may be deemed inoperable.

Additional rules may be established to better determine the operability status of a connection. For example, to provide quick detection of any change in the operability status, an indication of status change may trigger a reset of the data gathered for determining operability. For instance, once the status of a connection is determined to be operable, a single SIP request that fails to return a successful response such as "message 200" may trigger an immediate test of the connection. In the case, the immediate test may be a rapid fire of ten new attempts of exchange 202. If the number of successful responses returned is seven or greater, the connection is deemed to remain operable. Otherwise, the connection is deemed inoperable. Similarly, once the status of the connection is determined to be inoperable, a single SIP request that returns a successful response may trigger an immediate test of the connection.

In certain embodiment, performance statistics such as those discussed above may also be taken into account in determining the operability status of a connection. The performance statistics may be used individually or in combination. Just as an example, a connection may be deemed operable if the average RTT 500 shown FIG. 5 exceeds the RTT threshold 406 shown in FIG. 4. This indicates that the average round trip time of SIP communications over this connection has exceeded an acceptable level. In another example, a connection may be deemed operable if the measure of packet loss 508 shown in FIG. 5 falls below the packet loss threshold 404 shown in FIG. 4. This indicates the amount of packet loss over this connection is acceptable. In yet another example, a connection may be deemed operable if the average RTT 500 exceeds the RTT threshold 406, and the packet loss 508 falls below the packet loss threshold 404. Of course, more complex rules for determining whether a connection is operable can be established.

Furthermore, when more than one possible connection is operable, the performance statistics may be used to select a best connection. For example, FIG. 5 may indicate that the following connections are operable: (1) server 2 over TLS protocol, (2) server 2 over TCP protocol, (3) server 3 over TCP protocol, and (4) server 3 over UDP protocol. Here, there is a choice of different connections that may be used. According to an embodiment of the invention, performance statistics such as those shown in FIG. 5 may be used to decide which one out of connections (1) through (4) is the best connection to select.

Various rules may be established for using the performance statistics to select a best connection. These rules may be take into account the various performance statistics alone or in combination. For example, a weighting factor may be applied to each performance statistic considered, in order to consider a combination of performance statistics. Thus, a connection that has the best performance, as measured by a particular rule, can be selected to efficiently utilize connection resources for SIP communications.

Figure 6:
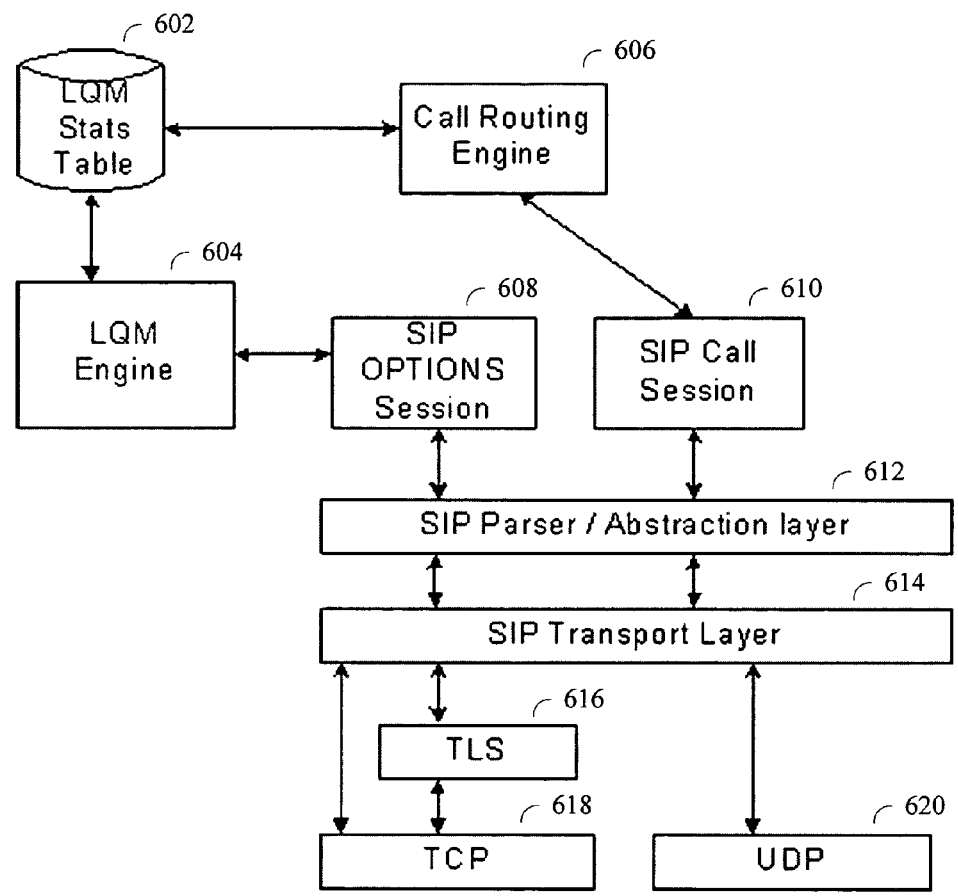
FIG. 6 is a block diagram of components and processes within one implementation of a SIP server according to an embodiment of the invention.

FIG. 6 is a block diagram of components and processes within one implementation of a SIP server such as SIP server 106, according to an embodiment of the invention. These various components and processes may be implemented in different ways as is known in the art, such as by hardware, software, or a combination of hardware and software. Here, SIP server 106 includes a data record referred to here has a Link Quality Management (LQM) stats table 602, a LQM engine 604, a call routine engine 606, a SIP OPTIONS session 608, a SIP call session 610, a SIP parser/abstraction layer 612, a SIP transport layer 614, a TLS module 616, a TCP module 618, and a UDP module 620.

SIP OPTIONS session 608 represents one of many SIP OPTIONS sessions that may be executed using SIP server 106 to collect information on potential connections. These connection may include connections with other SIP servers over different transport layer protocols. LQM engine 608 operates SIP OPTIONS session 608 to collect such information and stores the information to LQM stats table 602. LQM stats table 602 may be implemented within a data storage device associated with SIP server 106. The data storage device may be physically located within SIP server 106 or outside of SIP server 106, depending on implementation. In either case, the data storage device is communicatively coupled to engines 604 and 606 in SIP server 106. The information stored in LQM stats table 602 may include information such as that shown in configuration table 400 of FIG. 4 and dynamic statistics table 500 of FIG. 5. SIP OPTIONS session 608 operates by communicating with SIP parser/abstraction layer 612, which performs higher level processing for each SIP OPTIONS session. SIP parser/abstraction layer 612 communicates with SIP transport layer 614, which performs transport layer processing for each SIP OPTIONS session. This may include common transport layer processing that is common across different types of transport layer protocols. SIP transport layer 614 communicates with specific transport layer modules such as TLS module 616, TCP module 618, and UDP module 620. Each of these modules performs processing that is specific to a particular transport layer protocol. Operation of these various components together accomplishes the appropriate SIP OPTIONS session.

SIP call session 610 represents one of many SIP calls that may be executed using SIP server 106. These calls may be formed over different potential connections, which may include connections with other SIP servers over different transport layer protocols. Call routing engine 606 operates SIP call session 610 to efficiently establish SIP call communications such as call requests, by utilizing connection quality information already stored in LQM stats table 602. For example, call routine engine 606 may select a particular connection comprising a certain SIP server and a certain transport layer protocol, based on information obtained from LQM stats table 602. Again, the information stored in LQM stats table 602 may include information such as that shown in configuration table 400 of FIG. 4 and dynamic statistics table 500 of FIG. 5. SIP call session 610 operates by communicating with SIP parser/abstraction layer 612, which performs higher level processing for each SIP call session. SIP parser/abstraction layer 612 communicates with SIP transport layer 614, which performs transport layer processing for each SIP call session. This may include common transport layer processing that is common across different types of transport layer protocols. SIP transport layer 614 communicates with specific transport layer modules such as TLS module 616, TCP module 618, and UDP module 620. Each of these modules performs processing that is specific to a particular transport layer protocol. Operation of these various components together accomplishes the appropriate SIP call session.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for determining an appropriate transport protocol for supporting Session Initiation Protocol (SIP) communication between a first device and a second device comprising:
   sending a plurality of SIP requests from the first device destined for the second device, each SIP request being sent to the second device using a different one of a plurality of transport protocols available to the first device;
   detecting the availability of responses to the SIP requests sent from the first device to the second device;
   updating an entry for the second device in a data record associated with the first device based on the availability of responses to each SIP request sent by the first device destined for the second device so as to indicate whether the second device supports each of the plurality of transport protocols available to the first device, the data record including at least one indication of operability for each transport protocol; and
   selecting one of the transport protocols available to the first device, based on the entry for the second device in the data record, as a selected transport protocol for establishing a desired SIP communication between the first device and the second device.

2. The method of claim 1 wherein the SIP requests comprise SIP OPTIONS requests.

3. The method of claim 1 wherein the plurality of transport protocols include a Transport Layer Security (TLS) protocol, a Transmission Control Protocol (TCP), and a User Datagram Protocol (UDP).

4. The method of claim 1 wherein the plurality of SIP requests is repeatedly sent from the first device on a periodic basis.

5. The method of claim 1 wherein the at least one indication of operability comprises a listing of operable and non-operable transport protocols.

6. The method of claim 1 wherein the at least one indication of operability comprises a Boolean value for each of the transport protocols.

7. The method of claim 1 wherein the entry for the second device further comprises at least one performance statistic associated with each of the transport protocols.

8. The method of claim 7 wherein selection of the transport protocol is based on the at least one performance statistic.

9. The method of claim 8 wherein selection of the transport protocol includes selection of the second device from amongst a plurality of possible devices and selection of a transport protocol to be used in establishing the desired SIP communication with the second device.

10. The method of claim 7 wherein the at least one performance statistic comprises a measure of round trip time.

11. The method of claim 7 wherein the at least one performance statistic comprises a measure of rate of packet loss.

12. The method of claim 7 wherein the at least one performance statistic comprises a measure of time of last successful communication.

13. The method of claim 1 wherein the data record is stored within the first device.

14. The method of claim 1 wherein the first device and the second device are SIP servers.

15. An apparatus for determining an appropriate transport protocol for supporting Session Initiation Protocol (SIP) communication between a first device and a second device comprising:
- a first engine located in the first device to: send a plurality of SIP requests from the first device destined for the second device, each SIP request being sent to the second device using a different one of a plurality of transport protocols available to the first device, and detect the availability of responses to the SIP requests;
- a data storage device coupled with the first engine for storing a data record associated with the first device, the data storage device updating an entry for the second device in the data record based on the availability of responses to each SIP request sent by the first device destined for the second device so as to indicate whether the second device supports each of the plurality of transport protocols available to the first device, the data record including at least one indication of operability for each transport protocol; and
- a second engine located in the first device and coupled with the data storage device, the second engine to select one of the transport protocols available to the first device, based on the entry for the second device in the data record, as a selected transport protocol for establishing a desired SIP communication between the first device and the second device.

16. The apparatus of claim 15 wherein the SIP requests comprise SIP OPTIONS requests.

17. The apparatus of claim 15 wherein the plurality of transport protocols include a Transport Layer Security (TLS) protocol, a Transmission Control Protocol (TCP), and a User Datagram Protocol (UDP).

18. The apparatus of claim 15 wherein the first engine is configured to repeatedly send the plurality of SIP requests from the first device on a periodic basis.

19. The apparatus of claim 15 wherein the at least one indication of operability comprises a listing of operable and non-operable transport protocols.

20. The apparatus of claim 15 wherein the at least one indication of operability comprises a Boolean value for each of the transport protocols.

21. The apparatus of claim 15 wherein the entry for the second device further comprises at least one performance statistic associated with each of the transport protocols.

22. The apparatus of claim 21 wherein selection of the transport protocol is based on the at least one performance statistic.

23. The apparatus of claim 22 wherein selection of the transport protocol includes selection of the second device from amongst a plurality of possible devices and selection of a transport protocol to be used in establishing the desired SIP communication with the second device.

24. The apparatus of claim 21 wherein the at least one performance statistic comprises a measure of round trip time.

25. The apparatus of claim 21 wherein the at least one performance statistic comprises a measure of rate of packet loss.

26. The apparatus of claim 21 wherein the at least one performance statistic comprises a measure of time of last successful communication.

27. The apparatus of claim 15 wherein the data record is stored within the first device.

28. The apparatus of claim 15 wherein the first device and the second device are SIP servers.

29. A system for determining an appropriate transport protocol for supporting Session Initiation Protocol (SIP) communication between a first device and a second device comprising:
- means for sending a plurality SIP requests from the first device destined for the second device, each SIP request being sent to the second device using a different one of a plurality of transport protocols available to the first device;
- means for detecting the availability of responses to the SIP requests sent from the first device to the second device;
- means for updating an entry for the second device in a data record associated with the first device based on the availability of responses to each SIP request sent by the first device destined for the second device so as to indicate whether the second device supports each of the plurality of transport protocols available to the first device, the data record including at least one indication of operability for each transport protocol; and
- means for selecting one of the transport protocols available to the first device, based on the entry for the second device in the data record, as a selected transport protocol for establishing a desired SIP communication between the first device and the second device.

\* \* \* \* \*